United States Patent
Kim

(10) Patent No.: US 7,573,623 B2
(45) Date of Patent: Aug. 11, 2009

(54) HOLOGRAM RECORDING METHOD USING BEAM WITH VERY LARGE INCIDENT ANGLE, HOLOGRAM REPRODUCTION APPARATUS USING HOLOGRAPHIC REFLECTOR AND HOLOGRAM REPRODUCTION METHOD USING THE SAME, AND FLAT DISPLAY ELEMENT APPARATUS USING HOLOGRAPHIC REFLECTOR

(75) Inventor: Jong-man Kim, Kyungki-do (KR)

(73) Assignee: Samsung Electronics Co., Ltd., Suwon, Kyungki-Do (KR)

( * ) Notice: Subject to any disclaimer, the term of this patent is extended or adjusted under 35 U.S.C. 154(b) by 0 days.

(21) Appl. No.: 11/002,462

(22) Filed: Dec. 3, 2004

(65) Prior Publication Data

US 2005/0105151 A1 May 19, 2005

Related U.S. Application Data

(62) Division of application No. 10/138,642, filed on May 6, 2002, now Pat. No. 6,842,273.

(30) Foreign Application Priority Data

May 4, 2001 (KR) ............................... 2001-24381

(51) Int. Cl.
*G03H 1/22* (2006.01)
*G02B 5/32* (2006.01)
*G03H 1/26* (2006.01)
*G03H 1/00* (2006.01)

(52) U.S. Cl. ............... 359/32; 359/15; 359/22; 359/30

(58) Field of Classification Search ............... 359/15, 359/32, 22, 30
See application file for complete search history.

(56) References Cited

U.S. PATENT DOCUMENTS 5,151,800 A 9/1992 Upatnieks
5,237,149 A 8/1993 Macken
5,455,693 A 10/1995 Wreede et al.

(Continued)

FOREIGN PATENT DOCUMENTS

EP 0 562 839 A1 9/1993

(Continued)

OTHER PUBLICATIONS

Toshihiro Kubota et al.; "Method for reconstructing a hologram using a compact device"; Applied Optics, Optical Society of America, Washington, US, vol. 31, No. 23, Aug. 10, 1992, pp. 4734-4737.

(Continued)

*Primary Examiner*—Alessandro Amari
(74) *Attorney, Agent, or Firm*—Buchanan Ingersoll & Rooney PC

(57) ABSTRACT

Disclosed is a hologram recording method using a beam with a very large incident angle, a hologram reproduction apparatus using a holographic reflector, a hologram reproduction method using the same and a flat display element apparatus using a holographic reflector. The hologram recording method using a beam with a very large incident angle comprises the steps of generating a sheet beam as the reference beam, and introducing the reference beam into the recording medium at an incident angle of at least 70°. The hologram reproduction apparatus using a holographic reflector comprises a light, a holographic reflector, an adjustor, and a hologram. Also, the hologram reproduction method using the hologram reproduction apparatus comprises the steps of irradiating a beam emitted from a light source as a reference beam to a holographic reflector, reflecting the reference beam illuminated to the holographic reflector therefrom to generate a reconstructed beam, and allowing the generated reconstructed beam as a reference beam to pass through a hologram to reproduce the hologram. The flat display element apparatus comprises a light source, a holographic reflector, an adjustor, and a flat display element.

14 Claims, 10 Drawing Sheets

U.S. PATENT DOCUMENTS

| | | | |
|---|---|---|---|
| 6,023,356 | A | 2/2000 | Kihara et al. |
| 6,151,142 | A | 11/2000 | Phillips et al. |
| 6,639,631 | B1 * | 10/2003 | Hall et al. .................. 348/744 |
| 2001/0013961 | A1 * | 8/2001 | Klug et al. .................. 359/32 |
| 2002/0135830 | A1 * | 9/2002 | Endo et al. .................. 359/15 |

FOREIGN PATENT DOCUMENTS

| | | |
|---|---|---|
| EP | 0 821 293 A2 | 1/1998 |
| EP | 0 821 293 A3 | 11/1998 |
| JP | 50-57457 | 5/1975 |
| JP | 3-198023 A | 8/1991 |
| JP | 10-123325 A | 5/1998 |
| JP | 10-133554 | 5/1998 |
| JP | 2002-229467 A | 8/2002 |
| KR | 2001-0031135 | 4/2001 |
| WO | 99/63395 | 12/1999 |

OTHER PUBLICATIONS

European Search Report issued by the European Patent Office on Jun. 16, 2004 in corresponding application.

* cited by examiner

| | RECORDING WAVELENGTH | REFLECTANCE | TRANSMITTANCE |
|---|---|---|---|
| BLUE | 458nm | 96.3% | 0.2% |
| GREEN | 532nm | 96.5% | 0.5% |
| RED | 647nm | 96.8% | 0.8% |

HOLOGRAM RECORDING METHOD USING BEAM WITH VERY LARGE INCIDENT ANGLE, HOLOGRAM REPRODUCTION APPARATUS USING HOLOGRAPHIC REFLECTOR AND HOLOGRAM REPRODUCTION METHOD USING THE SAME, AND FLAT DISPLAY ELEMENT APPARATUS USING HOLOGRAPHIC REFLECTOR

CROSS REFERENCE TO RELATED APPLICATION

This application is a divisional of U.S. application Ser. No. 10/138,642 May 6, 2002, now U.S. Pat. No. 6,842,273.

BACKGROUND OF THE INVENTION

1. Field of the Invention

The present invention relates to a hologram recoding method, a hologram reproduction apparatus, a hologram reproduction method using the same and a flat display element apparatus, and more particularly, to a hologram recording method using a beam with a very large incident angle, a hologram reproduction apparatus using a holographic reflector, a hologram reproduction method using the same and a flat display element apparatus using a holographic reflector.

2. Description of the Related Art

A hologram refers to a three dimensional (3D) photographic image photograph created by means of a holography through a laser beam, which is produced in a such a fashion that a reference beam or one beam of two laser beams into which is divided by a beam splitter, and an object beam or the other divided by the beam splitter and then directed to and diffused from an object of interest to be recorded as information are projected onto a recording medium to record, in a photographic form, a large number of minute inference fringes produced by the interaction of the reference beam and the object beam on the surface of the recording medium so as to form an image of the original object.

Dennis Garbor has originally invented a hologram in 1948. From that time up to now, most widely used types of holograms include a two-beam transmission hologram developed by E. Leith et al., an one-beam reflection hologram developed by Denisyuk et al., and an edge-lit hologram developed by N. Phillips et al., and the like.

For such a transmission hologram, in the recording of it, all the reference and object beams are projected onto a recording medium in the same direction with respect to the recording medium to produce a hologram, and in the reproduction of it, a reference beam with same wavelength as that of the reference beam projected in the recording of the hologram illuminates the surface of the recording medium on which the hologram has been recorded, at the same incident angle as that in the recording of the hologram, while passing through the recording medium to obtain a reproduction beam to reconstruct the hologram in a direction opposite to the incident direction of the reference beam through diffraction and diffusion of the reproduction beam due to the interference fringes so as to form an image of the original object. At this point, the reproduction of the hologram means that information recorded on the hologram is represented visually.

For such a reflection hologram, in the recording of it, the reference beam and the object beam are projected onto the recording medium in the direction opposite to each other, in the reproduction of it, a reference beam with same wavelength as that of the reference beam in the recording of the hologram illuminates the surface of the recording medium on which the hologram has been recorded, at the same incident angle as that in the recording of the hologram, while being reflected by the recording medium to obtain a reproduction beam to reconstruct the hologram in the same direction as the incident direction of the reference beam so as to form an image of the original object.

FIG. 1 is a schematic view illustrating a general transmission type hologram recording method according to the prior art.

As shown in FIG. 1, a reference beam 11 and an object beam 13 are simultaneously projected onto a recording medium 15 in such a fashion that they are identical with each other in their incident directions.

FIG. 2 is a schematic view illustrating a general reflection type hologram recording method according to the prior art.

As shown in FIG. 2, a reference beam 11 and an object beam 13 are simultaneously projected onto a recording medium 15 in such a fashion that they are opposite to each other in their incident directions. In order to obtain a maximum efficiency in the recording of the hologram, the incident angles of both the reference and the object beams must be maintained at a predetermined angle. For this reason, an incident angle of a reference beam in the reproduction of the hologram must also be maintained at the predetermined angle to be identical with that of the reference beam in the recording of the hologram.

FIG. 3 is a schematic view illustrating a general transmission type hologram reproduction method according to the prior art.

As shown in FIG. 3, a reference beam 11 with the same wavelength and incident angle as those of the reference beam in the recording of the hologram illuminates the surface of the recording medium on which the hologram 17 has been recorded while passing through the recording medium to obtain a reproduction beam to reconstruct the hologram 17 in a direction opposite to the incident direction of the reference beam through diffraction and diffusion of the reproduction beam due to the interference fringes so as to form an image of the original object.

FIG. 4 is a schematic view illustrating a general reflection type hologram reproduction method according to the prior art.

As shown in FIG. 4, a reference beam 11 with the same wavelength and incident angle as those of the reference beam in the recording of the hologram illuminates the surface of the recording medium on which the hologram 17 has been recorded, at the same position as that in the recording of the hologram, while being reflected from the recording medium to obtain a reproduction beam to reconstruct the hologram 17 in the same direction as the incident direction of the reference beam so as to form an image of the original object.

FIG. 5 is a schematic view illustrating a color separation due to a diffraction of a reference beam generated in the reproduction of a transmission type hologram according to the prior art. A reproduction beam 19 formed by allowing the reference beam 11 to pass through or reflected by the recording medium on which the hologram 17 is recorded reproduces information recorded on the hologram 17, which makes it possible for an observer to view it in a stereoscopic or planar form.

In case of reproduction of a hologram based on such conventional hologram recording methods, a light source must be provided separately and the same condition as that in the recording of the hologram must be prepared. Accordingly, the conventional hologram reproduction methods are accompanied by the restraints on a place where the reproduction of the hologram is implemented. Also, in case of a holographic optical element (hereinafter, referred to as "HOE"), the size of an entire system becomes larger. Particularly, since the condition of irradiation for the reference beam at the time of reproducing a transmission type hologram must be identical with that of irradiation for the reference beam at the time of recording it, there may occur a problem in the place where a hologram is reproduced or the structure of a hologram reproduction apparatus.

In particular, as shown in FIG. 5, in the case where the hologram 17 or HOE has been recorded on a recording medium, and then is reproduced in a full color image form, a reproduction beam 19 is separated depending on its wavelength according to an irradiation angle of the reference beam 11.

In order to resolve this problem, in the recording of the hologram, a mirror is often used. But, this approach has a disadvantage in that it is not easy to adjust an angle of reflection of the mirror. Also, in case of employing other gratings or HOE, there occurs a color separation according to wavelengths of light beams, and the characteristics of a noise are insufficient.

In particular, in case of producing a hologram in a full color image form, efficiency is degraded.

In addition, for a conventional edge-lit hologram, it is very complicated to record a hologram and efficiency is degraded.

In general, it has been known that when a full color hologram or HOE is recorded on one recording medium, efficiency is lowered to ½, and reliability of color reproduction is decreased.

Further, it is difficult to adjust a hologram reproduction angle (reflection angle) by color.

SUMMARY OF THE INVENTION

To solve the above-described problems, it is an object of the present invention to provide a hologram recording method in which no restraints are imposed on the place where a hologram is reproduced or the structure of a hologram reproduction apparatus and it is simpler to reproduce the hologram.

It is another object of the present invention to provide a hologram reproduction apparatus and hologram reproduction method using the hologram reproduction apparatus with a more compact structure, in which, in the reproduction of a hologram, a recording medium can be illuminated at the same irradiation angle as that of a reference beam in the recording of a hologram irrespective of the types of holograms to obtain a reproduction beam.

It is still another object of the present invention to provide a hologram reproduction apparatus with a simpler structure and hologram reproduction method using the hologram production apparatus, in which an illumination device is configured using a holographic reflector so that even in case of a polychromatic light source, a reconstruction angle of a reconstructed beam is maintained equally, thereby resulting in a prevention of a color separation, and which can achieve improvements both in transmittance of wavelengths of beams and in reproduction efficiency of a hologram.

It is yet another object of the present invention to provide a flat display element apparatus which is provide with an irradiation device having a smaller variation in a color temperature according to wavelengths of beams, thereby improving transmittance of wavelengths of the beams and reproduction efficiency of a hologram.

In order to accomplish this object, there is provided a method of recording a hologram in which a reference beam and an object beam are introduced into a recording medium, comprising the steps of generating a sheet beam as the reference beam, introducing the reference beam into the recording medium at an angle of at least 70°. In this case, a single beam may be used as the reference beam and the object beam.

The generating step may further include the steps of optically processing a point beam emitted from a certain light source to generate a linear beam, and optically processing the linear beam to generate the sheet beam. Here, the step of optically processing a point beam to generate a linear beam is a step of shaping a point beam using an appropriate optical means to generate a linear beam.

It is preferred that the step of optically processing the point beam may further include the step of allowing the point beam to pass through a cylindrical lens or to be reflected by a cylindrical surface mirror to generate the linear beam. Preferably, the step of optically processing the linear beam may further include the step of allowing the linear beam to pass through a semi-cylindrical lens so that a line width of the linear beam is adjusted to generate the sheet beam.

Further, the reference beam as the sheet beam may be introduced directly into the recording medium or may be introduced indirectly into the recording medium through the reflection of a mirror. The object beam may be introduced directly into the recording medium or may pass through a semitransparent mirror, and then may be introduced into the recording medium.

According to another aspect of the present invention, there is also provided an apparatus for reproducing a hologram, comprising a light source for emitting light, a holographic reflector for receiving, as a reference beam, a beam emitted from the light source and reflecting a reference beam therefrom to generate a reconstructed beam, an adjustor for adjusting an irradiation angle of the reference beam directed to the holographic reflector from the light source, and a hologram for receiving, as the reference beam, the reconstructed beam reflected by the holographic reflector.

It is preferred that the hologram may include a transmission type hologram recorded in such a fashion that the reference beam is introduced into the hologram at an incident angle of at least 70°. Preferably, the holographic reflector may include at least one selected from the group of three holographic reflectors recorded with beams of red, green and blue colors.

Further, the holographic reflector is constructed in such a fashion that the holographic reflector recorded with a beam of the blue color is arranged in the front of the three holographic reflectors so that it is first illuminated when viewed in the irradiation direction of the reference beam.

Also, the light source may include any one selected from the group of a linear metal lamp, a fluorescent lamp, a cold cathode fluorescent tube (hereinafter, referred to as "CCFT") and an LED array.

It is preferred that the adjustor may include a concave reflecting plate disposed at the rear side of the light source, or a cylindrical lens or a light diffusing plate disposed at the front side of the light source. A wedge prism or an optical flat element may further be disposed between the holographic reflector and the hologram.

According to another aspect of the present invention, there is also provided a method of reproducing a hologram, comprising the steps of:

irradiating a beam emitted from a light source as a reference beam to a holographic reflector;

reflecting the reference beam illuminated to the holographic reflector therefrom to generate a reconstructed beam; and allowing the generated reconstructed beam as a reference beam to pass through a hologram to reproduce the hologram.

It is preferred that the irradiating step may further include the step of allowing the reference beam illuminated to the holographic reflector from the light source to be reflected by a concave reflecting plate disposed at the rear side of the light source.

It is preferred that the beam irradiating step may further include the step of allowing the reference beam illuminated to the holographic reflector from the light source to pass through a cylindrical lens or a light diffusing plate disposed at the front side of the light source.

It is also preferred that in the reference beam reflecting step, an emitting angle of the reconstructed beam from the holographic reflector may be adjusted according to a wavelength of the reflected reference beam.

Preferably, in the allowing step, a wedge prism or an optical flat element may further be disposed between the holographic reflector and the hologram.

Also, the hologram may include a transmission type hologram recorded in such a fashion that the reference beam is introduced into the hologram at an incident angle of at least 70°.

According to another aspect of the present invention, there is also provided a flat display element apparatus, comprising:

a light source for emitting light;

a holographic reflector for receiving, as a reference beam, a beam emitted from the light source and reflecting the reference beam therefrom to generate a reconstructed beam;

an adjustor for adjusting an irradiation angle of the reference beam directed to the holographic reflector from the light source; and a flat display element for receiving, as a reference beam, the reconstructed beam reflected by the holographic reflector.

Preferably, the holographic reflector may include at least one selected from the group of three holographic reflectors recorded with beams of red, green and blue colors.

Further, the holographic reflector is constructed in such a fashion that the holographic reflector recorded with a beam of the blue color is arranged in the front of the three holographic reflectors so that it is first illuminated when viewed in the irradiation direction of the reference beam.

Also, the light source may include any one selected from the group of a linear metal lamp, a fluorescent lamp, a cold cathode fluorescent tube (hereinafter, referred to as "CCFT") and an LED array.

It is preferred that the adjustor may include a concave reflecting plate disposed at the rear side of the light source, and a cylindrical lens or a light diffusing plate disposed at the front side of the light source. A wedge prism or an optical flat element may further be disposed between the holographic reflector and the hologram.

It is preferred that the flat display element may include an LCD. In this case, the structures and functions of the holographic reflector, the light source and the adjustor have the same those as described in a hologram reproduction apparatus using a holographic reflector and a hologram reproduction method using the same.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Hereinafter, a hologram recording method, a hologram reproduction apparatus and a hologram reproduction method using the same, and flat display element apparatus according to preferred embodiments of the present invention will be in detail described with reference to the accompanying drawings.

First, a hologram recording method according to preferred embodiments of the present invention will be described hereinafter.

Figure 1:
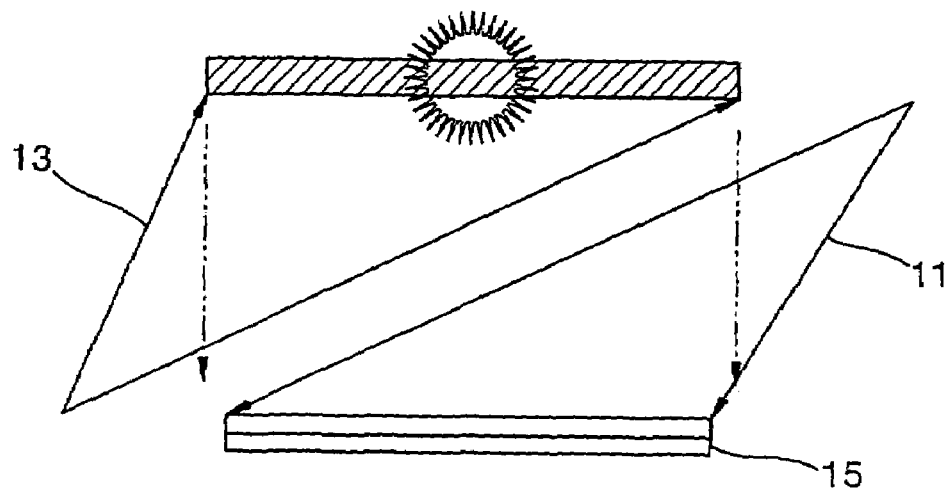
FIG. 1 is a schematic view illustrating a general transmission type hologram recording method according to the prior art.
Figure 2:
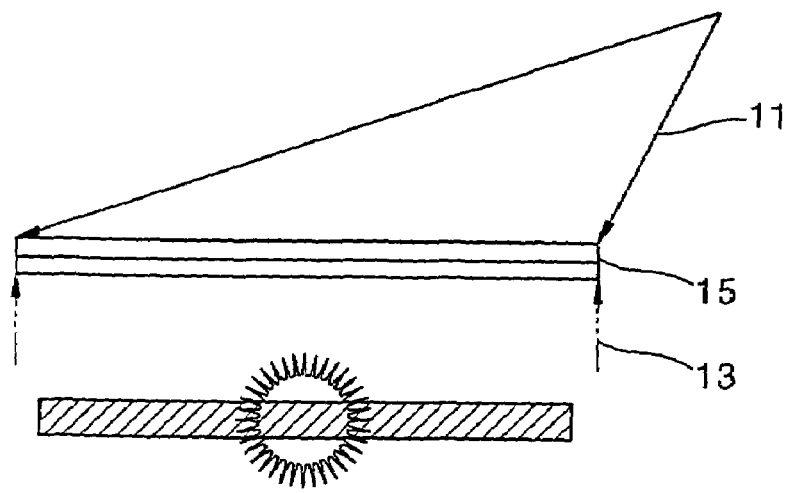
FIG. 2 is a schematic view illustrating a general reflection type hologram recording method according to the prior art.
Figure 3:
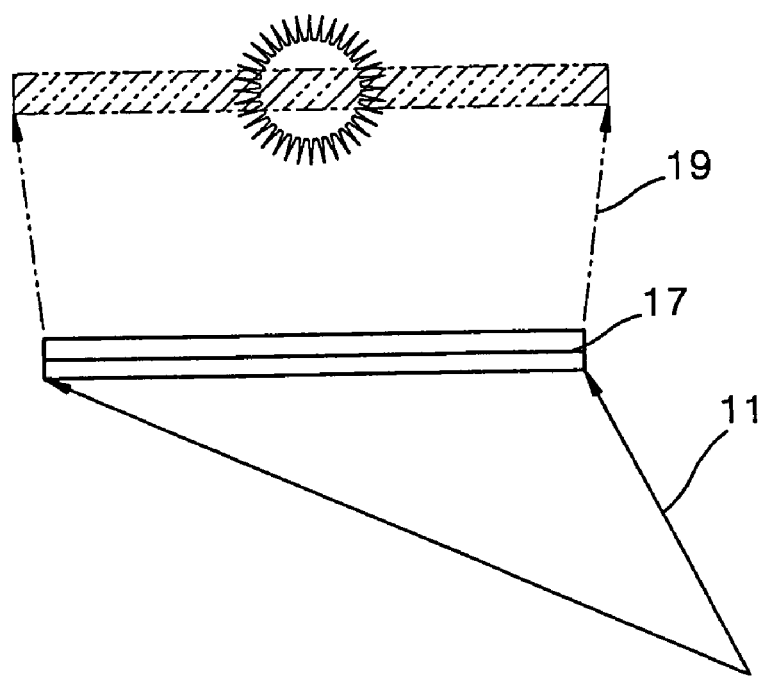
FIG. 3 is a schematic view illustrating a general transmission type hologram reproduction method according to the prior art.
Figure 4:
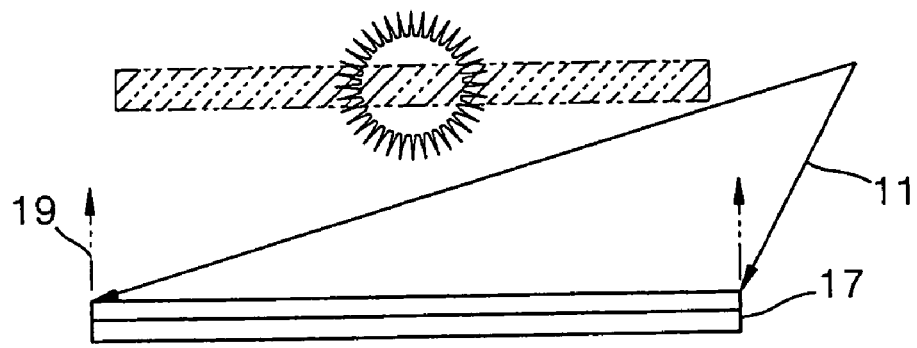
FIG. 4 is a schematic view illustrating a general reflection type hologram reproduction method according to the prior art.
Figure 5:
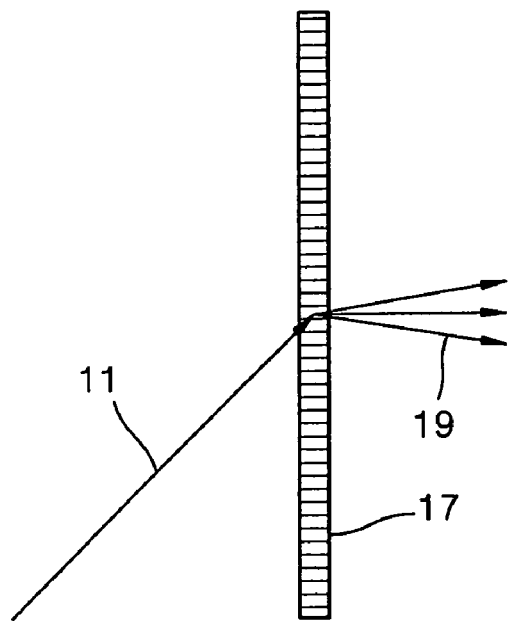
FIG. 5 is a schematic view illustrating a color separation due to a diffraction of a reference beam generated in the reproduction of a transmission type hologram according to the prior art.
Figure 6:
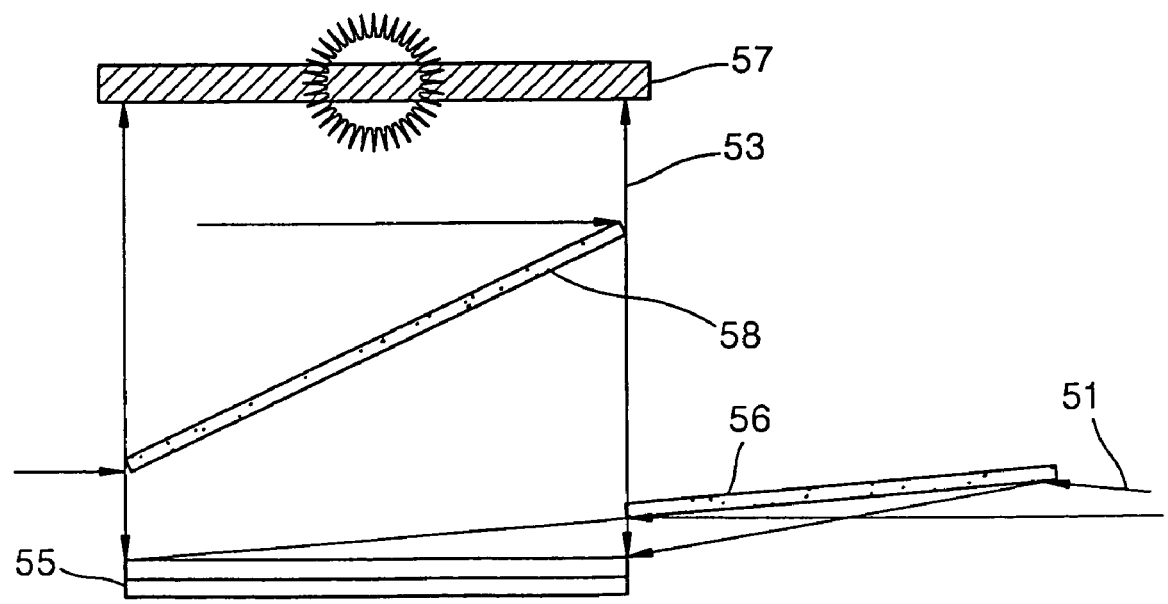
FIG. 6 is a schematic view illustrating a transmission type hologram recording method according to a first embodiment of the present invention.

FIG. 6 is a schematic view illustrating a transmission type hologram recording method according to a first embodiment of the present invention.

Referring to FIG. 6, a reference beam 51 is projected directly onto a recording medium 55 at a large angle of more than 70° or is projected indirectly onto the recording medium 55 through the reflection of a mirror 56 and, simultaneously, an object beam 53 is projected directly onto the recording medium 55 or projected indirectly onto the recording medium 55 through reflection of a semitransparent mirror 21 in the same plane as that of the recording medium 55 onto which the reference beam 11 is projected. In this point, the object beam 53 refers to a light beam that is scattered from an object 57 to be recorded on the recording medium 55. The recording medium 55 becomes a transmission hologram or HOE for recording information about the object.

Figure 7:
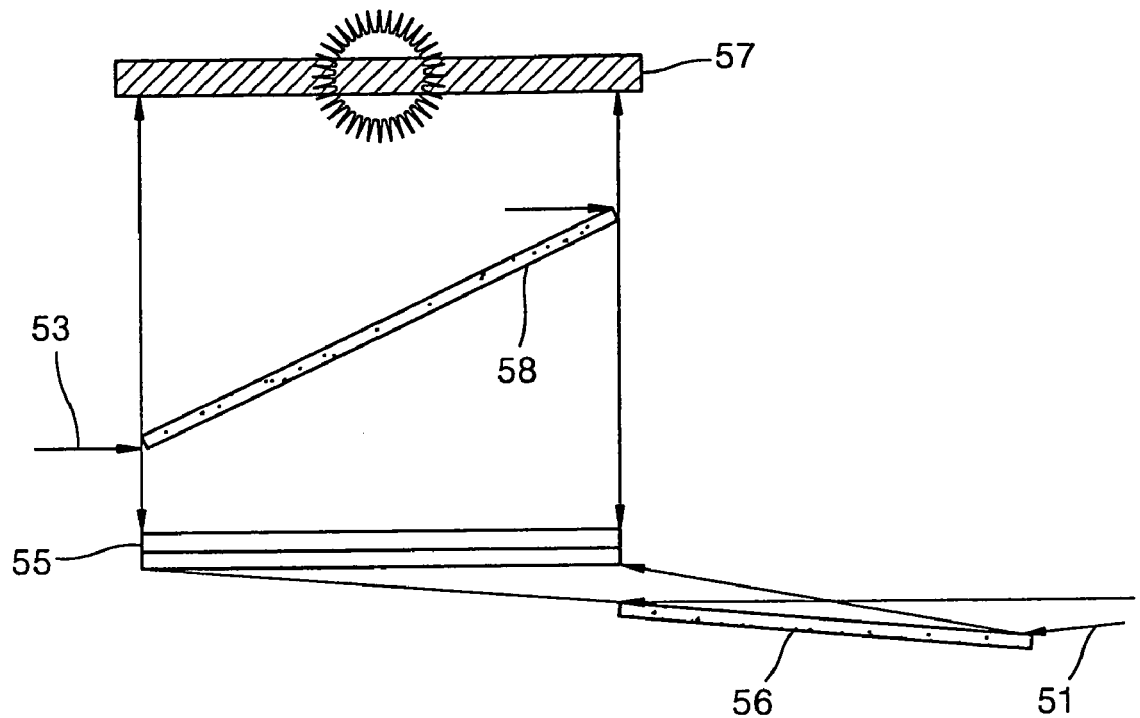
FIG. 7 is a schematic view illustrating a reflection type hologram recording method according to a first embodiment of the present invention.

FIG. 7 is a schematic view illustrating a reflection type hologram recording method according to a first embodiment of the present invention.

Referring to FIG. 7, the reflection type hologram recording method is different from the transmission type hologram recording method in that the reference beam 51 and the object beam 53 are projected onto the recording medium in the direction opposite to each other. However, the reflection type hologram recording method is identical with the transmission type hologram recording method in a manner in which the reference beam 51 and the object beam 53 are projected onto the recording medium 55.

In the above hologram recording methods according to the present invention, the reference beam 51 is projected onto the recording medium 55 at a large angle of more than 70° to produce a hologram, so that a more compact hologram reproduction apparatus can be implemented. For example, for a hologram or a holographic optical element (HOE) recording method in which a reference beam has a large incident angle of more than 70°, if the hologram or HOE is recorded on one recording medium in one wavelength form, a high efficiency of more than 90% can be obtained at the time of reproduction of the hologram, and the wavelength and angle of the beam reproduced can also be easily adjusted.

Figure 8:
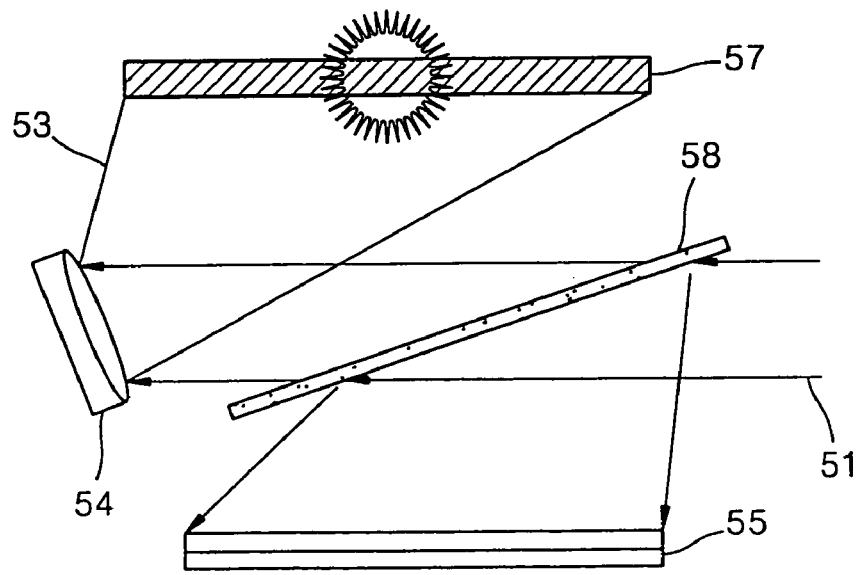
FIG. 8 is a schematic view illustrating a transmission type hologram recording method according to a second embodiment of the present invention.

FIG. 8 is a schematic view illustrating a transmission type hologram recording method of the hologram recording methods using a single beam with a large incident angle, according to a second embodiment of the present invention.

Referring to FIG. 8, a reference beam 51 is reflected by a semitransparent mirror 21 to be directed into a recording medium 55, while passing through the semitransparent mirror 58 to be directed to a concave mirror 54 by which the reference beam, in turn, is reflected so that an object beam 53 is generated. The reference beam 51 and the object beam 53 are directed to the recording medium 55 in such a fashion that they are identical with each other in their incident directions. In this case, the reference beam 51 as a sheet beam is introduced into the recording medium 55 at a large angle of more than 70°.

Figure 9:
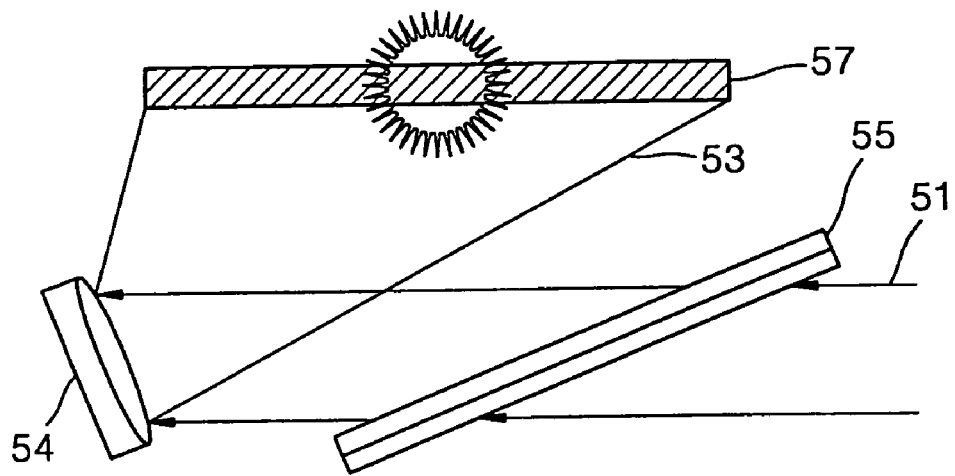
FIG. 9 is a schematic view illustrating a reflection type hologram recording method according to a second embodiment of the present invention.

FIG. 9 is a schematic view illustrating a reflection type hologram recording method of the hologram recording methods using a single beam with a large incident angle, according to a second embodiment of the present invention.

Referring to FIG. 9, a reference beam 51 is directed into a recording medium 15, while passing through the recording medium 55 to be directed to a concave mirror 54 by which the reference beam, in turn, is reflected so that an object beam 53 is generated. The reference beam 51 and the object beam 53 are directed to the recording medium 55 in such a fashion that they are opposite to each other in their incident directions. In this case, the reference beam 51 as a sheet beam 31 is introduced into the recording medium 55 at a large angle of more than 70°. The incident angle of the reference beam 51 is preferably set at a large angle of more than 70° in order to make an optical system compact.

Generally, in case of employing one beam instead of using more than two beams, the recording of a hologram can be done more simply. However, in the prior art, there have been problems in that, for the sake of convenience of irradiation in the reproduction of the hologram, a reference beam must be introduced into a recording medium at the incident angle of 45°. Also, since the reproduction of the hologram requires the use of the same irradiation angle as the incident angle, i.e., 45° of the reference beam in the recording of the hologram, the dimensions of an entire hologram reproduction system becomes larger. For the reflection type hologram recorded and reproduced using a single beam according to the present invention, since it is recorded through the use of a reference beam having a large incident angle of more than 70, a hologram reproduction apparatus of a simpler structure can be implemented.

Figure 10:
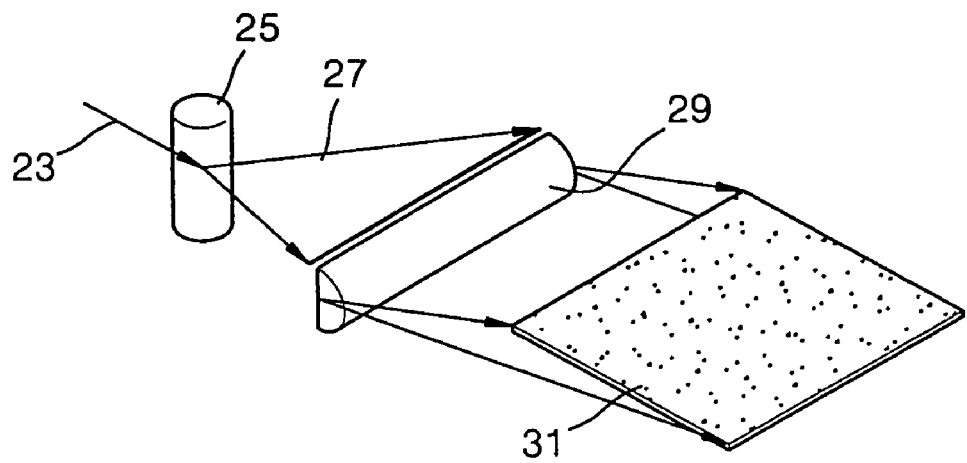
FIG. 10 is a schematic perspective view illustrating a method of producing a sheet beam using a cylindrical lens in a hologram recording method according to an embodiment of the present invention.

FIG. 10 is a schematic perspective view illustrating a method of producing a sheet beam using a cylindrical lens in a hologram recording method according to an embodiment of the present invention.

Referring to FIG. 10, there is shown a process for generating a sheet beam 31 as the reference beam 51. In this process, first, a point beam 23 emitted from a point light source passes through a cylindrical lens 25 to generate a linear beam 27 which, in turn, passes through a semi-cylindrical lens 29 so that a line width of the linear beam 27 is adjusted to generate the sheet beam 31.

Figure 11:
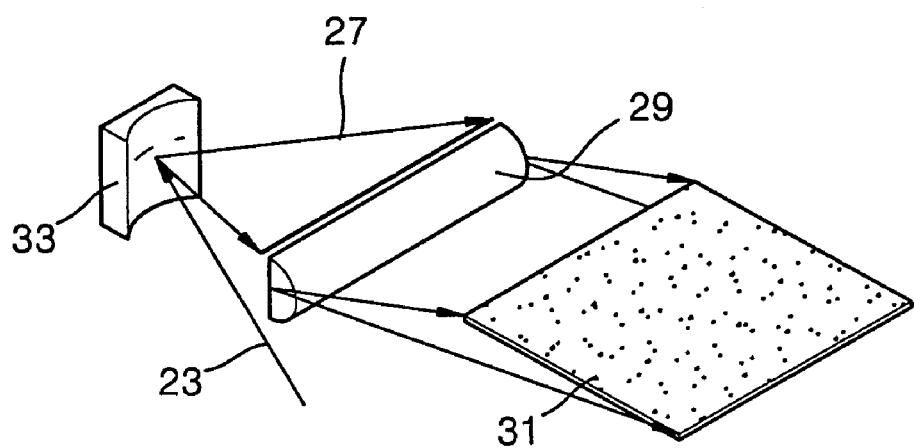
FIG. 11 is a schematic perspective view illustrating a method of producing a sheet beam using a cylindrical surface mirror in a hologram recording method according to an embodiment of the present invention.

FIG. 11 is a schematic perspective view illustrating a method of producing a sheet beam using a cylindrical surface mirror in a hologram recording method according to an embodiment of the present invention.

Referring to FIG. 11, there is shown a process for generating a sheet beam 31 as the reference beam 51. In this process, first, a point beam 23 emitted from a point light source is directed to a cylindrical surface mirror 33 by which the point beam 23 is reflected to generate a linear beam 27 which, in turn, passes through a semi-cylindrical lens 29 so that a line width of the linear beam 27 is adjusted to generate the sheet beam 31 which is projected uniformly onto the recording medium 15.

The aim of using the sheet beam 31 as the reference beam 51 is to improve reproduction efficiency in the reproduction of a hologram by allowing the reference beam to uniformly illuminate the surface of the recording medium 55. Since respective portions on the hologram possess all information about an object of interest to be recorded on the recording medium, it is important that the information such as the phase and amplitude of an object beam scattered from the object should be recorded uniformly and distinctly on the recording medium. The more uniformly the information is recorded on the recording medium, the more distinctly an image of the object appears at the time of reproduction of the hologram and the greater reproduction efficiency of the hologram is improved.

Now, a hologram reproduction apparatus according to the present invention will be described in detail hereinafter.

Figure 12:
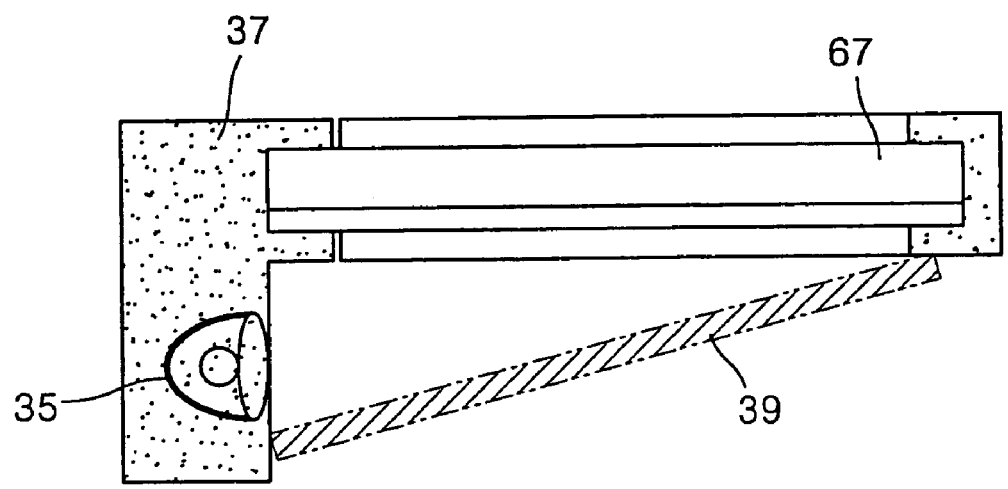
FIG. 12 is a sectional side view illustrating a hologram reproduction apparatus according to a first embodiment of the present invention.

FIG. 12 is a sectional side view illustrating a hologram reproduction apparatus according to a first embodiment of the present invention.

As shown in FIG. 12, the hologram reproduction apparatus according to the present invention includes a light source 35, a recording medium 67 for receiving, as a reference beam, a light beam emitted from the light source 35, a hologram being recorded on the recording medium 67, and a support 37 for supporting both sides of the recording medium 67, the support having the light source 35 installed at one side thereof.

There is disposed a cylindrical lens or a light diffusing plate at the front side of the light source 35, or a concave reflecting plate is disposed at the rear side of the light source 35 for adjusting an illumination angle and an illumination area of a reference beam introduced into the recording medium 67. In order to obtain a clear reproduction beam, the illumination angle of the reference beam in the reproduction of the hologram must be adjusted depending on the incident angle of a reference beam in the recording of the hologram.

The hologram recorded on the recording medium 67 may be a transmission type hologram or a reflection type hologram. In case of the transmission type hologram, a beam as a reference beam emitted from the light source 35 passes through the recording medium 67 to generate a reconstructed beam which is diffused in a direction opposite to the incident direction of the reference beam, i.e., in the upward direction of the drawing sheet to reproduce the hologram so as to form an image of an original object. On the other hand, in case of the reflection type hologram, the reference beam is reflected by the recording medium 67 to generate a reconstructed beam which is diffused in the same direction as the incident direction of the reference beam, i.e., in the downward direction of the drawing sheet to reconstruct the hologram.

The support 37 includes the light source 35 installed at one side thereof, and acts to support both sides of the recording medium 67. Also, the hologram reproduction apparatus may include a holographic reflector 39 arranged on the optical path of the beam directed to the recording medium 67 from the light source 35.

The holographic reflector 39 enables the irradiation angle of the reference beam to be easily adjusted in the reproduction of the transmission type hologram. In case of the reproduction of a polychromatic hologram, a hologram reproduction apparatus of a simpler structure can be manufactured and used for preventing a dispersion of colors.

Figure 13:
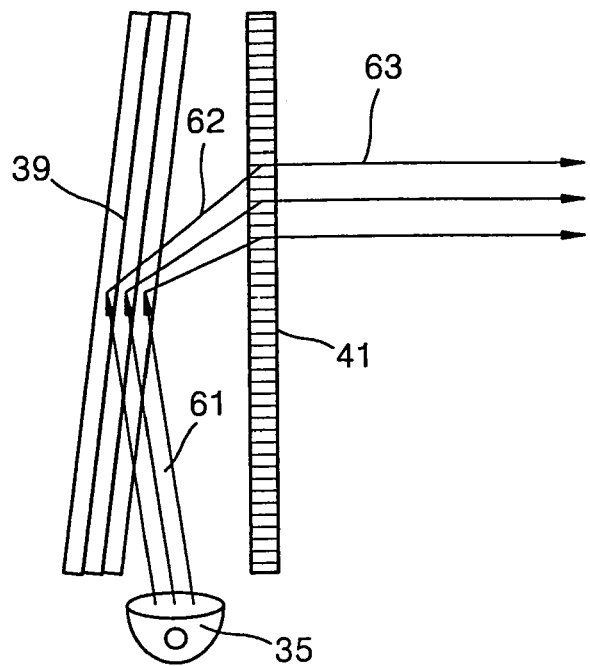
FIG. 13 is a side view illustrating a transmission type hologram reproduction apparatus according to a second embodiment of the present invention.

FIG. 13 is a side view illustrating a transmission type hologram reproduction apparatus employing a holographic reflector according to a second embodiment of the present invention.

As shown in FIG. 13, the transmission type hologram reproduction apparatus using a holographic reflector includes a light source 35, a holographic reflector 39 for receiving, as a reference beam, a beam emitted from the light source 35 and reflecting the reference beam therefrom to generate a reconstructed beam, and a recording medium 41 for receiving, as a reference beam, the reconstructed beam reflected by the holographic reflector 39 and allowing the received reference beam to pass therethrough to generate a reproduction beam so as to reproduce a transmission type hologram.

The reference beam 61 emitted from the light source 35 is reflected by the holographic reflector 39 which allows the reflected beam to regenerate and diverge at different reconstruction angles according to each of the wavelengths of light beams with which the holographic reflector 61 is recorded to direct to the recording medium 41. The beams reflected by the holographic reflector 39 are adjusted such that their reconstruction angles become equal to each other, which illuminate the surface of the recording medium 41 so that a reproduction beam is obtained to reproduce the transmission type hologram in a direction opposite to the incident direction of the reference beam through diffraction and diffusion of the reproduction beam due to the interference fringes so as to form an image of the original object.

The aim of making the different reconstruction angles of the beam reflected and regenerated by the holographic reflector 39 identical with each other is to minimize a dispersion effect of colors due to reflective indexes and diffractions according to different wavelengths of the reproduction beam at the time of reproduction of the transmission type hologram or HOE.

A principle of adjusting the reconstruction angle of the reference beam reflected and diverged by the holographic reflector 39 will now be described in detail hereinafter.

When the reference beam reflected by the holographic reflector 39 illuminates on the surface of the recording medium 41 on which the transmission type hologram or HOE is recorded, beams of red, green and blue colors are reproduced at a predetermined angle in any particular direction so that a reproduction beam is obtained to reproduce the hologram.

When a transmission type holographic reflector is recorded with a green beam the wavelength and incident angle of which is λG and θG, respectively, the spacing dG between adjacent gratings of the transmission type holographic reflector can be written as the following [Expression 1].

$$dG = \lambda G/(2\sin\theta G) \qquad \text{[Expression 1]}$$

As shown in the above [Expression 1], in the case where the gratings in the holographic reflector as recorded above are regenerated to become a red color and a blue color, a red color reconstruction angle and a blue color reconstruction angle of a beam to be regenerated are given by the following [Expression 2] and [Expression 3], respectively.

$$\theta R = \sin-1(\lambda R/2dG) \qquad \text{[Expression 2]}$$

$$\theta B = \sin-1(\lambda B/2dG) \qquad \text{[Expression 3]}$$

where θR is the red color reconstruction angle, and θB is the blue color reconstruction angle.

Figure 17:
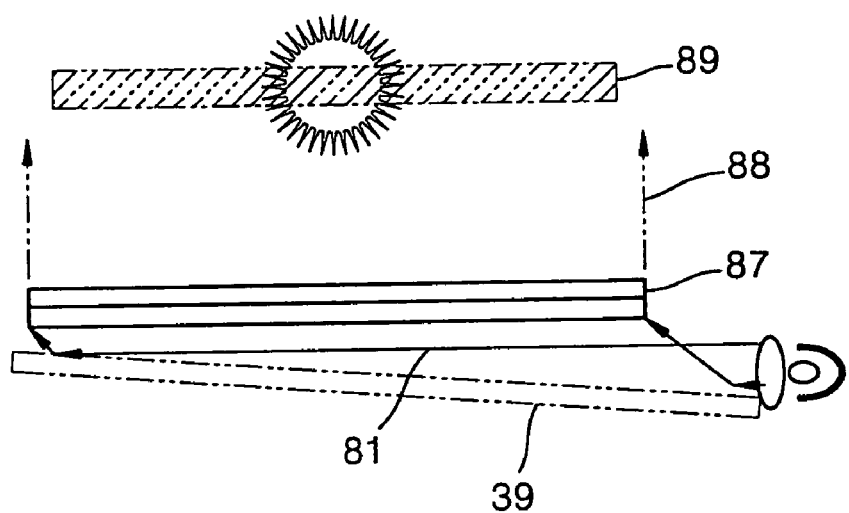
FIG. 17 is a schematic view illustrating a transmission type hologram reproduction method according to a first embodiment of the present invention.

When the reflection angles of holographic reflectors at the back side in the holographic reflector 39 of a laminated structure are adjusted suitably according to the above reconstruction angles so that all the reconstruction angles of the three color wavelengths become θG, a regeneration of a white light is possible. When the holographic reflector 39 for regenerating three colors is fixed to a base plate and the holographic reflector 39 is illuminated by a reference beam 11 using a light source, a reflective plate lens and the like, a white light is regenerated in a desired direction as shown in FIG. 17.

Figure 14:
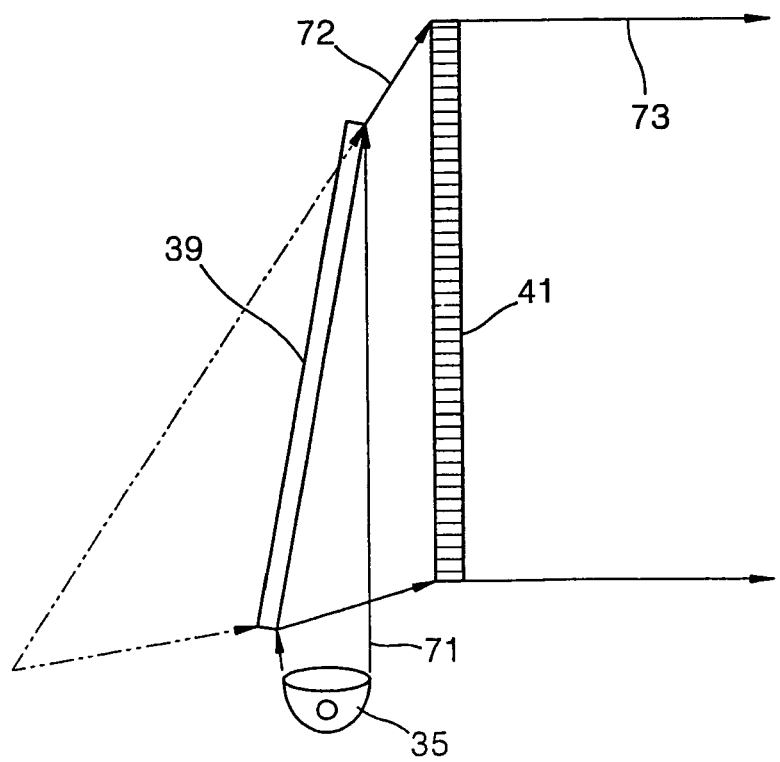
FIG. 14 is a schematic side view illustrating a transmission type hologram reproduction apparatus according to a second embodiment of the present invention.

Using such a reconstruction angle adjusting principle, a compact transmission type hologram reproduction apparatus can be manufactured as shown in FIG. 14.

In case of a general light source, a beam of a blue color has a lower brightness or intensity. For this reason, although all the beams of red, green and blue colors in a spectrum of a light source are identical with one another in a light intensity, a beam of a shorter wavelength is more rapidly absorbed or degraded in transmittance in terms of the characteristics of a base plate used in an optical instrument, a hologram or a display, etc. In order to address this problem, when manufacturing the holographic reflector 39 recorded with beams of three colors of red, green and blue, the holographic reflector 39 of a structure laminated in the order of blue, red and green colors is used when viewed in the irradiation direction of the reference beam 61 to be regenerated. Even in case of using a laminated holographic reflector recorded with beams of two colors including a blue color among the three colors, the holographic reflector recorded with a beam of the blue color is arranged in the front of the laminated holographic reflector when viewed in the irradiation direction of the beam to be regenerated so that the blue color recorded holographic reflector is first illuminated, thereby improving a reproduction efficiency of a blue beam.

FIG. 14 is a schematic side view illustrating a transmission type hologram reproduction apparatus using a holographic reflector shown in FIG. 13.

In the above embodiment, a light source 35 may include a linear metal lamp, a fluorescent lamp, a CCFT or an LED array. An optical system as an adjustor for adjusting the shape of a beam, i.e., an irradiation area and irradiation angle of a beam to illuminate the transmission type hologram 41 is identical with the above described transmission type hologram reproduction apparatus.

Next, a flat display element apparatus according to a first embodiment of the present invention will be described hereinafter with reference to FIG. 15.

Figure 15:
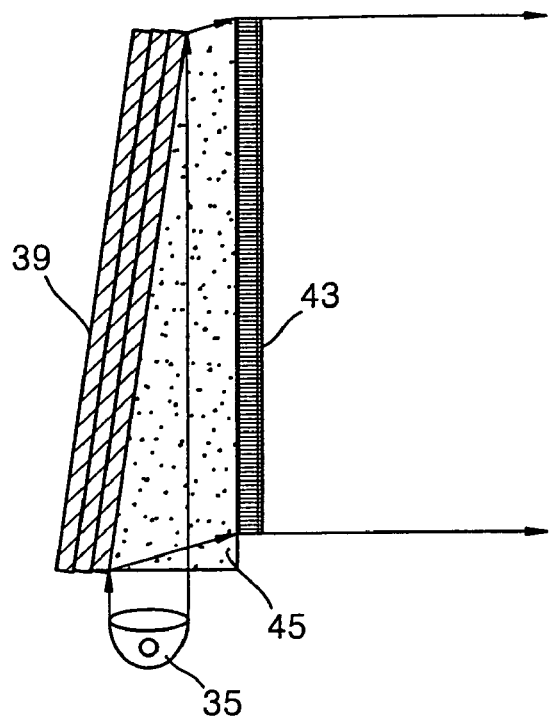
FIG. 15 is a side view illustrating a flat display element apparatus constituting an LCD back light according to a first embodiment of the present invention.

FIG. 15 is a side view illustrating a flat display element apparatus constituting an LCD back light according to a first embodiment of the present invention.

Referring to FIG. 15, an LCD back light according to the present invention includes a light source 35, a holographic reflector 39 and an LCD 43. The structures of the light source 35 and the holographic reflector 39 are the same as those of the light source 35 and the holographic reflector 39 as shown in FIGS. 13 and 14 except that the hologram 41 as the recording medium in FIGS. 13 and 14 is replaced with the LCD 43 in FIG. 15, which have already been described. A wedge prism 45 may further be disposed between the holographic reflector 39 and the LCD 43. The wedge prism 45 serves to maintain the function of an irradiation section and define an optical path. Also, a function for diffusing a beam or a light diffusing plate can be added on the surface of the wedge prism 45 to obtain a more uniform irradiation.

The holographic reflector 39 is fixed to one end of the wedge prism 45 at an inclined angle and the light source 35 is disposed at one edge of the wedge prism 45. The beam emitted from the light source 35 is directed to the holographic reflector 39 using a concave mirror or a lens. An illumination beam reflected by the holographic reflector 39 passes through the wedge prism 45 while being diverged to illuminate the LCD 43 so that an LCD back light is implemented.

Figure 16:
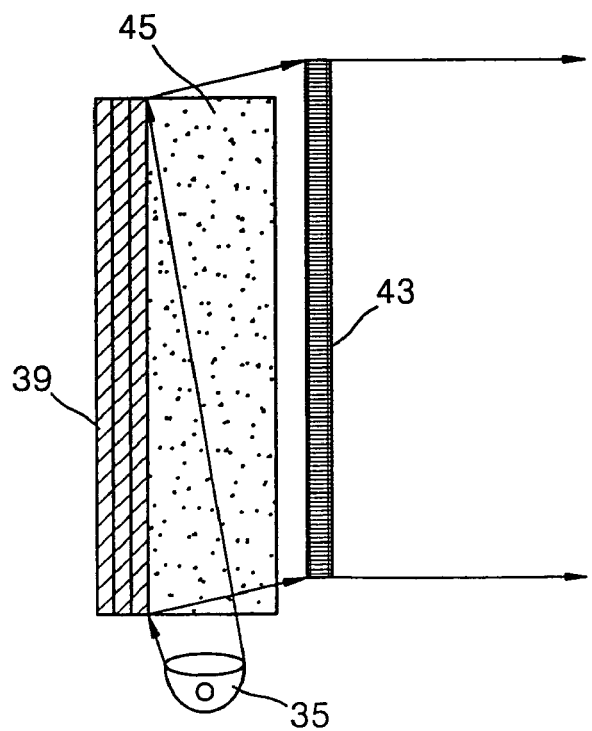
FIG. 16 is a schematic side view illustrating the flat display element apparatus of FIG. 15.

FIG. 16 is a schematic side view illustrating the LCD back light of FIG. 15.

Referring to FIG. 16, it can be seen that an adjustment of the reconstruction angle of the holographic reflector 39 makes the reconstruction angles of beams according to different wavelengths identical. This illumination angle adjustment principle has already been described above.

FIG. 17 is a schematic view illustrating a transmission type hologram reproduction method according to a first embodiment of the present invention.

Figure 18:
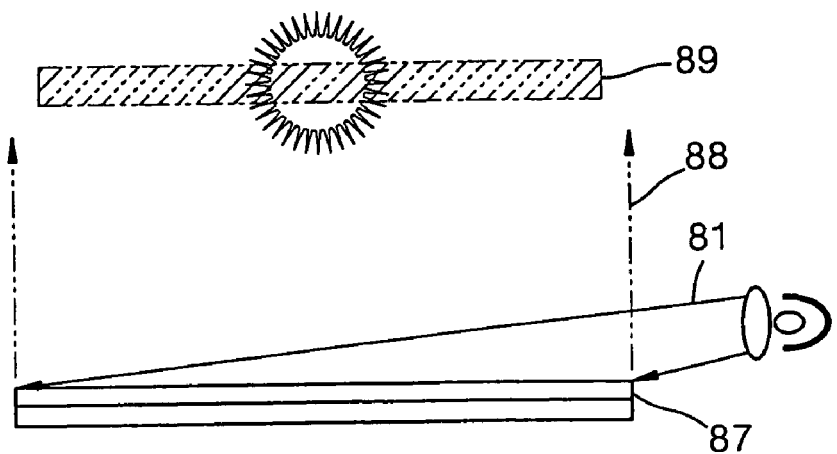
FIG. 18 is a schematic view illustrating a reflection type hologram reproduction method according to a first embodiment of the present invention.

FIG. 18 is a schematic view illustrating a reflection type hologram reproduction method according to a first embodiment of the present invention.

Referring to FIG. 17, the above hologram reproduction method is identical with a convention hologram reproduction method except that in case of a hologram recorded according to the present invention, since a reference beam is directed to the hologram 87 at an incident angle of more than 70° at the time of the recording of the hologram 87, at the time of reproduction of the hologram, the reference beam must also be directed to the holographic reflector 39 at the same incident angle as that at the time of the recording of the hologram.

In case of the transmission type hologram, the reference beam 81 reflected by the holographic reflector 39 illuminates the hologram 87 at the same incident angle as that in the recording of the hologram 87 while passing through it so that a reproduction beam 89 is generated to reproduce the hologram 87 in a direction opposite to the incident direction of the reference beam through diffraction and diffusion of the reproduction beam due to the interference fringes so as to form an image of the original object. On the other hand, in case of the reflection type hologram, the reference beam 81 reflected by the holographic reflector 39 illuminates the hologram 87 at the same incident angle as that in the recording of the hologram while being reflected by the hologram 87 so that a reproduction beam 89 is generated to reproduce the hologram 87 in the same direction as the incident direction of the reference beam so as to form an image of the original object.

Also, in case of a hologram reproduction method using a single beam, the same hologram reproduction method as the above described hologram reproduction method is used.

Figures 19, 20:
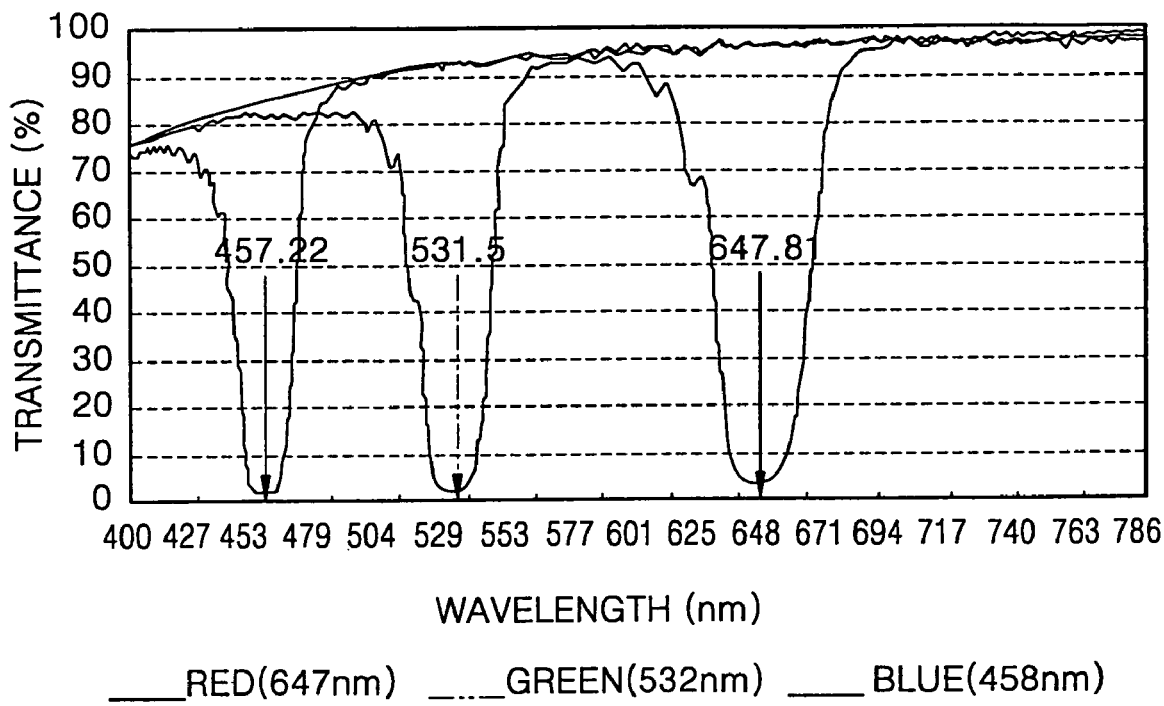
FIG. 19 is a graph illustrating a variation in transmittance of a hologram depending on different wavelengths of beams in a hologram recording method according to the present invention.
FIG. 20 is a table illustrating a variation in reflectance and transmittance of a hologram depending on different wavelengths of beams.

FIG. 19 is a graph illustrating a variation in transmittance of a hologram depending on different wavelengths of beams in a hologram recording method according to the present invention.

Referring to FIG. 19, as a result of the manufacture of HOE to which a reference beam is directed at a larger incident angle, satisfactory results have been obtained in view of an illumination angle, wavelengths of regeneration beams and a hologram reproduction efficiency.

Referring to FIG. 19, in a reflection type HOE in which PFG-03C is used as a recording medium, respective values of transmittance and reflectance with respect to a red wavelength (647 nm), a green wavelength (532) and a blue wavelength (458) are depicted. It can be seen from the graph of FIG. 19 that when blue, green and red wavelengths are 457.22 nm, 531.5 nm and 647.81 nm, respectively, in a horizontal (X) axis, all the values of transmittance of beams with respect to the three color wavelengths are below 1%, while all the values of reflectance of beams of the three colors are high.

FIG. 20 is a table illustrating a variation in reflectance and transmittance of a hologram depending on different wavelengths of beams.

Referring to FIG. 20, it can be seen from the table of FIG. 20 that in case of a silver halide sensitized gelatin (SHSG) reflection type HOE, when blue, green and red wavelengths are 458 nm, 532 nm and 647 nm, respectively, the values of reflectance of beams with respect to the three color wavelengths are 96.3%, 96.5% and 96.8%, respectively, while the values of transmittance of beams of the three colors are 0.2%, 0.5% and 0.8%, respectively. Accordingly, in the case where a reference beam is directed to a holographic reflector at a large incident angle, a hologram with a very high reproduction efficiency can be manufactured.

As described above, a hologram recorded and reproduced according to the present invention has an advantage in that in case of reproduction of the hologram, a compacter holographic system or holographic display can be manufactured without a limitation on a hologram reproduction place or the structure of a hologram reproduction apparatus. Further, the use of a holographic reflector prevents a color dispersion due to a diffraction of a reconstructed beam generated on a general transmission type hologram or HOE so that a white light reflected by the holographic reflector is used as an illumination beam to implement a reproduction of a polychromatic beam. Furthermore, a hologram recording and reproduction method according to the present invention makes it possible to manufacture a highly efficient LCD back light.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. An apparatus for reproducing a hologram, comprising:
   a light source for emitting light;
   a holographic reflector for receiving, as a reference beam, a beam emitted from the light source and reflecting the reference beam therefrom to generate a reconstructed beam;
   an adjustor, which comprises a light diffusing plate disposed at the front side of the light source, for diffusing the reference beam directed to the holographic reflector from the light source; and
   a recording medium including the hologram for receiving, as a reference beam, the reconstructed beam reflected by the holographic reflector, the hologram recorded such that the reference beam is introduced into the recording medium at an incident angle of at least 70° when the hologram is a transmission type hologram.

2. The apparatus as claimed in claim 1, wherein the holographic reflector comprises at least one selected from the group of three holographic reflectors recorded with beams of red, green and blue colors.

3. The apparatus as claimed in claim 1, wherein the light source comprises one selected from the group consisting of a linear metal lamp, a fluorescent lamp, a cold cathode fluorescent tube (CCFT) and a Light emitting diode (LED) array.

4. The apparatus as claimed in claim 1, wherein the adjustor comprises a concave reflecting plate disposed at the rear side of the light source.

5. The apparatus as claimed in claim 1, wherein the apparatus has a capability to reconstruct both a transmission type hologram and a reflection type hologram.

6. An apparatus for reproducing a hologram, comprising:
   a light source for emitting light;
   a holographic reflector for receiving, as a reference beam, a beam emitted from the light source and reflecting the reference beam therefrom to generate a reconstructed beam;
   an adjustor, which comprises light diffusing, plate disposed at the front side of the light source, for adjusting an irradiation angle of the reference beam directed to the holographic reflector from the light source; and
   a hologram for receiving the reconstructed beam reflected from the holographic reflector,
   wherein the holographic reflector comprises at least one selected from the group consisting of three laminate holograms respectively recorded with red, green and blue beams of light, and wherein the holographic reflector is arranged in such a fashion that the laminate hologram recorded with the blue beam of light is first illuminated when viewed in the irradiation direction of the reference beam.

7. An apparatus for reproducing a hologram, comprising:
   a light source for emitting light;
   a holographic reflector for receiving, as a reference beam, a beam emitted from the light source and reflecting the reference beam therefrom to generate a reconstructed beam;
   an adjustor, which comprises a cylindrical lens or a light diffusing plate disposed at the front side of the light source, for adjusting an irradiation angle of the reference beam directed to the holographic reflector from the light source;
   a recording medium including the hologram for receiving, as a reference beam, the reconstructed beam reflected by the holographic reflector, the hologram recorded such that the reference beam is introduced into the recording medium at an incident angle of at least 70° when the hologram is a transmission type hologram; and
   a wedge prism or an optical flat element disposed between the holographic reflector and the hologram.

8. A flat display element apparatus, comprising:
   a light source for emitting light;
   a holographic reflector for receiving, as a reference beam, a beam emitted from the light source and reflecting the reference beam therefrom to generate a reconstructed beam;
   an adjustor which comprises a light diffusing plate disposed at the front side of the light source for diffusing the reference beam directed to the holographic reflector from the light source; and
   a flat display element including a hologram for receiving, as a reference beam, the reconstructed beam reflected by the holographic reflector, the hologram recorded such that the reference beam is introduced into the flat display element at an incident angle of at least 70° when the hologram is a transmission type hologram.

9. The flat display element apparatus as claimed in claim 8, wherein the flat display element is an LCD.

10. The flat display element apparatus as claimed in claim 8, wherein the holographic reflector comprises at least one selected from the group of three holographic reflectors recorded with beams of red, green and blue colors.

11. The flat display element apparatus as claimed in claim 8, wherein the light source comprises one selected from the group consisting of a linear metal lamp, a fluorescent lamp, a cold cathode fluorescent tube (CCFT) and a Light emitting diode (LED) array.

12. The flat display element apparatus as claimed in claim 8, wherein the adjustor comprises a concave reflecting plate disposed at the rear side of the light source.

13. A flat display element apparatus, comprising:
    a light source for emitting light;
    a holographic reflector for receiving, as a reference beam, a beam emitted from the light source and reflecting the reference beam therefrom to generate a reconstructed beam, said holographic reflector including three laminate holograms that are respectively recorded with red, green, and blue beams of light;
    an adjustor, which comprises light diffusing plate disposed at the front side of the light source for adjusting an irradiation angle of the reference beam directed to the holographic reflector from the light source; and
    a flat display element for receiving the reconstructed beam reflected from the holographic reflector,
    wherein the holographic reflector is arranged in such a fashion that the laminate hologram recorded with the blue beam of light is first illuminated when viewed in the irradiation direction of the reference beam.

14. A flat display element apparatus comprising:
    a light source for emitting light;
    a holographic reflector for receiving, as a reference beam, a beam emitted from the light source and reflecting the reference beam therefrom to generate a reconstructed beam;

an adjustor which comprises a cylindrical lens or a light diffusing plate disposed at the front side of the light source for adjusting an irradiation angle of the reference beam directed to the holographic reflector from the light source;

a flat display element including a hologram for receiving, as a reference beam, the reconstructed beam reflected from the holographic reflector, the hologram recorded such that the reference beam is introduced, into the flat display element at an incident angle of at least 70° when the hologram is a transmission type hologram; and a wedge prism or an optical flat element disposed between the flat display element and the holographic reflector.

* * * * *